Patented Nov. 14, 1922.

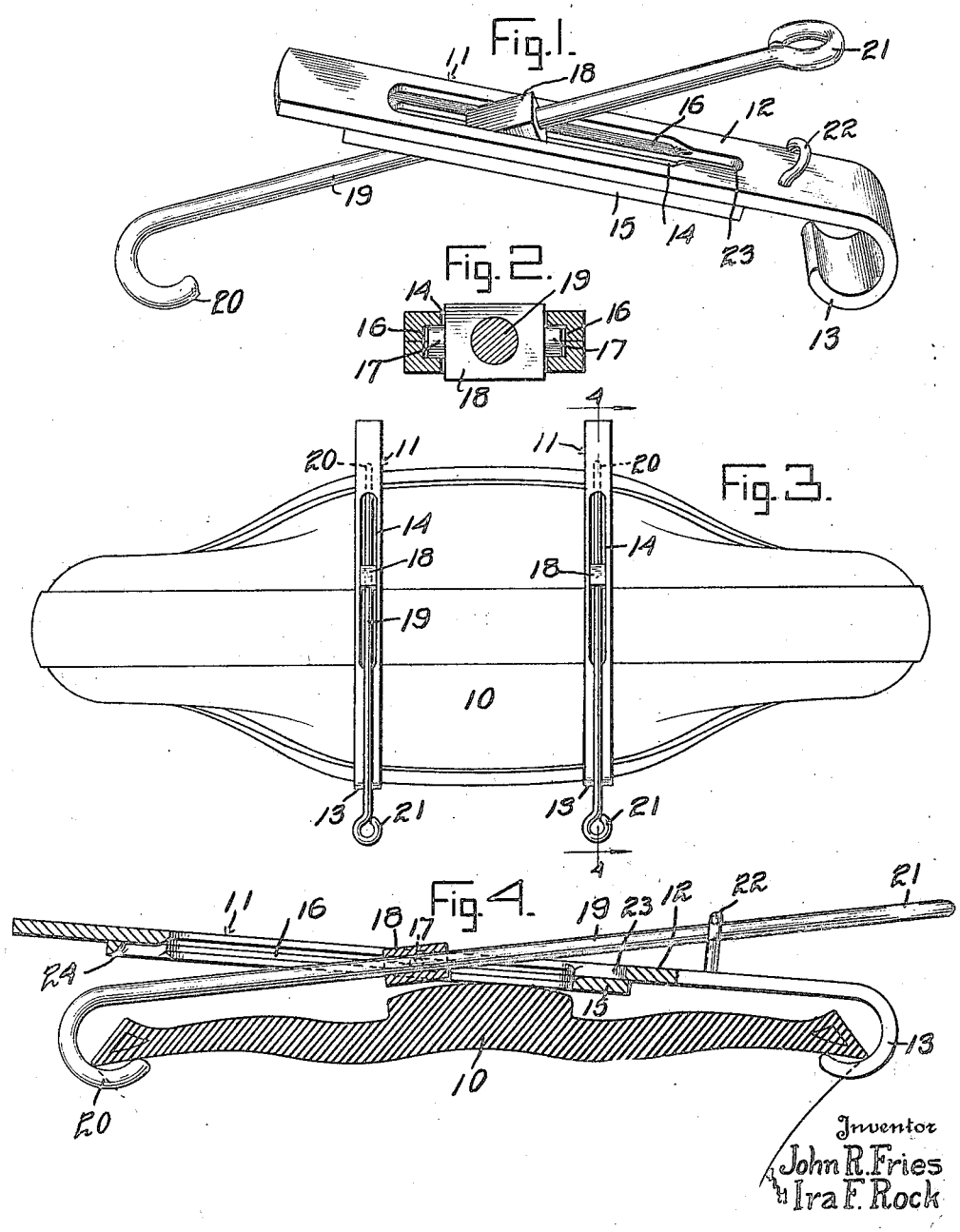

1,435,833

UNITED STATES PATENT OFFICE.

JOHN R. FRIES AND IRA F. ROCK, OF WAYNESBORO, PENNSYLVANIA.

TIRE SPREADER.

Application filed April 6, 1922. Serial No. 550,084.

*To all whom it may concern:*

Be it known that we, JOHN R. FRIES and IRA F. ROCK, citizens of the United States, residing at Waynesboro, in the county of Franklin and State of Pennsylvania, have invented certain new and useful Improvements in Tire Spreaders, of which the following is a specification.

Our said invention relates to a tool for laying open a tire to facilitate inspection of the interior and also to facilitate cleaning and repair of the tire. It is an object of the invention to provide a device of the character described which shall be simple and cheap but effective in operation.

Referring to the accompanying drawings which are made a part hereof and on which similar reference characters indicate similar parts, Figure 1 is a perspective of the device, Figure 2 a section through the pivot thereof, Figure 3 a plan of two of the devices in operative position on a tire, and Figure 4 a section on line 4—4 of Figure 3.

In the drawings reference character 10 indicates an open-bellied tire, a portion of which is spread out in substantially flat position for the purposes above described. This is done by the use of one or more implements 11. Each of these implements comprises a flat member 12 having one end bent over at 13 to form a hook and having a longitudinal slot 14.

At the under side of the member 12 a strip of metal 15 is secured thereto and this has a slot corresponding to that of the other member while the contacting faces of the two members are cored out to provide a pair of longitudinal grooves 16 in which may slide the trunnions 17 of a block 18.

The block 18 has a longitudinal opening in which is slidably mounted a rod 19 having at one end a hook 20 and at the other end a handle 21. A hook 22 is provided on the member 12 beneath which the rod 19 may be engaged as shown in Figure 4. Preferably we also provide a narrow elongation of the slot 14 in member 12 as shown at 23 and a similar elongation of the slot in member 15 as shown at 24, this being for the purpose of permitting the parts 19 to swing open as far as possible.

In the operation of our device the parts are held more or less closed in the position shown in Figure 1 and the hooks 13 and 20 are engaged under the edges of the tire in a manner which will be evident, the rod 19 and block 18 being adjusted according to the size of the tire. The parts are then opened out into the form shown in Figure 4, or sufficiently to permit the rod to be engaged under the hook 22 for holding the tire in open position. Additional tools 11 may be applied at proper intervals according to the stiffness of the tire and the extent to which it is to be opened.

It will be obvious to those skilled in the art that our device may be modified in various ways without departing from the spirit of the invention, the true scope of which is indicated in the appended claims.

Having thus fully described our said invention, what we claim as new and desire to secure by Letters Patent, is:

1. In a tire spreader, a pair of members having hooks at corresponding ends adapted to engage under the edges of a tire, pivotal means for joining together said members intermediate their ends and a hook on one of said members adapted to engage and hold the other in open position, substantially as set forth.

2. In a tire spreader, a relatively wide member having a hook at one end and having a longitudinal slot, a block pivotally and slidably mounted in said slot and a rod slidably connected to said block and having a hook adapted to engage the opposite side of the tire, substantially as set forth.

3. A tire spreader comprising a flat member having a hook at one end and having a longitudinal slot with internal grooves extending laterally therefrom, a block located in said slot and having trunnions in said grooves and a second hooked member slidably connected to said block, substantially as set forth.

4. In a tire spreader, a pair of members having hooks at corresponding ends adapted to engage under the edges of a tire, one of said members having a sliding pivotal connection to the other, substantially as described and for the purpose set forth.

In witness whereof, we have hereunto set our hands and seals at Waynesboro, Pennsylvania, this thirty-first day of March, A. D., nineteen hundred and twenty two.

JOHN R. FRIES. [L. S.]
IRA F. ROCK. [L. S.]

Witnesses:
J. LEONARD FRIES,
ALF. N. RUSSELL.